Nov. 14, 1961   G. I. WOOD, JR   3,008,283
MEANS FOR PREVENTING THE ACCUMULATION OF GRASS DEPOSITS
ON THE UNDERSIDE OF THE HOOD OF A ROTARY MOWER
Filed June 11, 1959
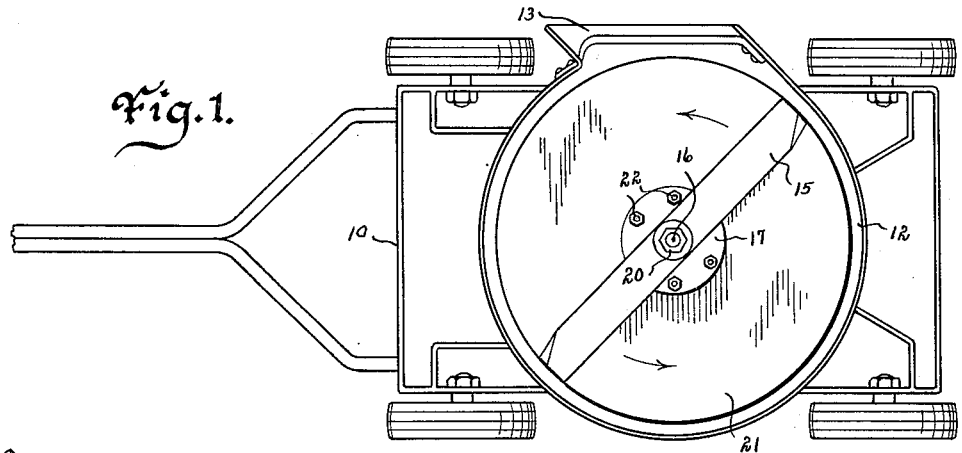
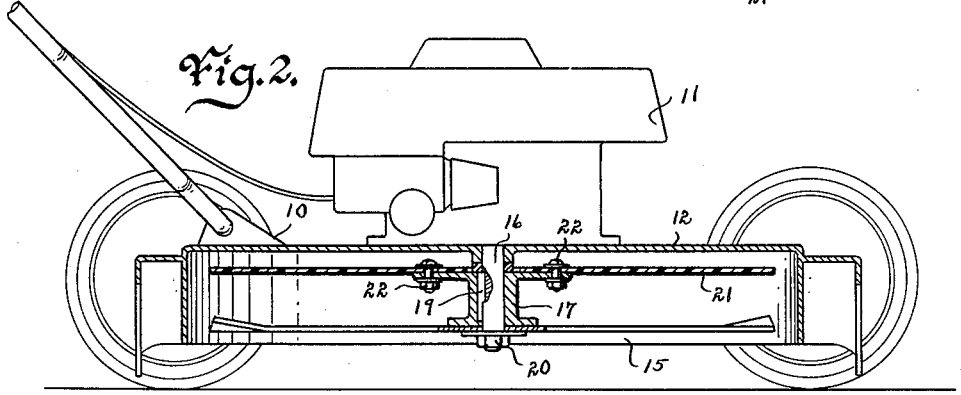
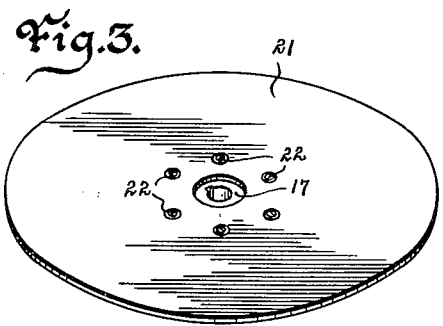
Witness
Edward P. Seeley
Inventor
George I. Wood Jr.
by M. Talbert Dick
Attorney

United States Patent Office 3,008,283
Patented Nov. 14, 1961

3,008,283
MEANS FOR PREVENTING THE ACCUMULATION OF GRASS DEPOSITS ON THE UNDERSIDE OF THE HOOD OF A ROTARY MOWER
George I. Wood, Jr., Des Moines, Iowa, assignor to Western Tool and Stamping Company, Des Moines, Iowa, a corporation of Iowa
Filed June 11, 1959, Ser. No. 819,662
2 Claims. (Cl. 56—25.4)

This invention relates to mowing machines of the rotary type having a horizontal cutting blade, and more particularly to a method of and means for preventing the objectionable accumulation of grass fiber deposits on the inside of the mowing machine canopy.

The most universally used lawn mowing machine is the horizontal rotary cutting blade type. While such machines have many advantages over other types of mowers, much difficulty is experienced in the removal of grass fiber deposits on the underside of the mower canopy. This problem is most prevalent when the grass is wet or very green and tender. The accumulated grass matting becomes most hard unless it is immediately removed. If the underside of the canopy is not cleaned for a week after the mowing operation, it is sometimes necessary to use tools such as a chisel and hammer to remove the collected deposits. Apparently one of the reasons for the resultant toughness of the accumulated grass fibers is that the sap or juice of most grasses is sticky and almost glue-like. Not only is the removal of the fibrous material difficult, but serious accidents are possible in the removal of the same due to the sharp cutting blade being present within the circular canopy of the mowing machine.

Therefore one of the principal objects of my invention is to provide a method of and means for preventing the accumulation of foreign matter deposits on the underside of the canopy of rotary mowers.

A still further object of this invention is to provide a means for expediting the cut grass of a rotary mower through its discharge port.

A still further object of this invention is to provide a more efficient rotary type mowing machine.

Still further objects of my invention are to provide a means for eliminating grass deposits on the underside of the canopy of rotary type mowers that is economical of manufacture and durable in use.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 1 is a bottom view of a rotary mowing machine with my device installed thereon;

FIG. 2 is an enlarged longitudinal sectional view of a rotary mowing machine using my device; and FIG. 3 is a perspective view of my device prior to installation on a mowing machine and more fully illustrates its construction.

In these drawings I have used the numeral 10 to generally designate a rotary mowing machine having the usual prime mover 11, the canopy 12, canopy top opening 13, and horizontal rotary cutting blade 15 detachably secured to the prime mover shaft 16. It is for such a type of mowing machine that I employ my unit and which I will now describe in detail.

The numeral 17 designates a bearing detachably embracing the motor shaft 16 and positioned between the inside top of the canopy 12 and the rotary cutting blade 15 as shown in FIG. 2. The bearing member 17 is held against independent rotation on the shaft 16 by any suitable means such as by the key 19. Both the cutting blade 15 and the bearing 17 rotate with the shaft 16 and these two members are detachably held on the shaft 16 by the usual nut 20 threaded on the lower outer end of the shaft 16. The numeral 21 designates a horizontal plate secured to the bearing 17 by any suitable means such as bolts 22. This circular plate 21 is spaced from but closely adjacent the inside top of the hood canopy 12 and is spaced substantially above the cutting blade 15 as shown in FIG. 2.

During the early experimentations of the device I made this plate 21 of light metal. However, in use the light metal plate became quickly distorted and bent. I next used a heavy metal circular plate but while it functioned successfully in eliminating grass deposits in the hood canopy, difficulty was experienced in turning the mowing machine at a corner due to the gyroscopic action set up by the rotating heavy metal plate. Therefore it became obvious that the plate 21 should be of lightweight material not subject to becoming bent and distorted during usage. I find that a most satisfactory plate results if the same is made of a woven glass filamentary material, plastic, or like. Such material is lightweight, strong and has a resiliency to return to a flat shape if it has been accidentally flexed.

With my unit installed, foreign matter will not collect on the underside of the canopy of mowing machines. At least one reason for this is that the cut and bruised grass propelled upwardly from the blade 15 will strike the underside of the plate 21 but this plate will be moved at the same speed as that of the blade 15 and substantially at the same speed as that of the moving cut material. Also by the plate 21 being rotated at high speed, it will cast off all materials therefrom by centrifugal force and the same will pass from the mowing machine through the discharge opening 13. The plate 21 will remain clean and about the only indication of a foreign matter deposit will be the grass staining of its color. The diameter of the plate 21 is slightly less than the inside diameter of the canopy hood 12. With the grass, blade, and plate 21 rotating together, even the inside skirt wall of the canopy hood 12 will be substantially free of clinging deposits of foreign matter. With the inside of the hood canopy 12 kept clean the mowing machine will perform its task more efficiently. Also the conducting of the cut material through the opening 13 will be more effective.

Some changes may be made in the construction and arrangement of my method of and means for preventing the accumulation of grass deposits on the underside of the hood of a rotary mower without departing from the real spirit and purpose of my invention, and it is my intention to cover by my claims, any modified forms of structure or use of mechanical equivalents which may be reasonably included within their scope.

I claim:
1. In combination, a rotary mowing machine having a hood canopy, a motor, motor shaft, and a rotary horizontal cutting blade secured to the motor shaft and within the canopy hood, and an impervious horizontal plate secured to said motor shaft and spaced between said cutting blade and the inside top of said canopy hood; said plate being of a resilient light weight woven glass filamentary material.

2. The combination defined in claim 1 and further including bearing means rotatable with said shaft and carrying said plate, said bearing means comprising a collar surrounding and keyed to said shaft above said blade, and a horizontal flange integral with said collar and projecting laterally thereof from the end of said collar remote from said blade, said plate being fixed on said flange.

References Cited in the file of this patent

UNITED STATES PATENTS

| | | |
|---|---|---|
| 2,641,100 | Sylvester | June 9, 1953 |
| 2,760,327 | Bovee | Aug. 28, 1956 |
| 2,796,714 | Denney | June 25, 1957 |
| 2,888,796 | Denney | June 2, 1959 |